(12) United States Patent
Park et al.

(10) Patent No.: US 8,173,334 B2
(45) Date of Patent: May 8, 2012

(54) COLOR FILTER SUBSTRATE AND METHOD OF FABRICATING THE SAME

(75) Inventors: Sung Il Park, Daegu-si (KR); Kwang Soon Park, Daegu-si (KR); Hong Jae Kim, Gyeonggi-do (KR); Tae Man Kim, Busan-si (KR); Tae Woong Moon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 354 days.

(21) Appl. No.: 11/372,063

(22) Filed: Mar. 10, 2006

(65) Prior Publication Data

US 2007/0002218 A1   Jan. 4, 2007

(30) Foreign Application Priority Data

Jun. 29, 2005   (KR) .................. 10-2005-0056853

(51) Int. Cl.
*G02B 5/20* (2006.01)
(52) U.S. Cl. .......................................... 430/7
(58) Field of Classification Search .................. 349/107
See application file for complete search history.

(56) References Cited

U.S. PATENT DOCUMENTS

| 5,085,973 | A  | * | 2/1992  | Shimizu et al.  | 430/271.1 |
| 2004/0119921 | A1 | * | 6/2004  | Chang et al.    | 349/114   |
| 2004/0223096 | A1 | * | 11/2004 | Ochiai et al.   | 349/107   |
| 2005/0019677 | A1 | * | 1/2005  | Nakatsu et al.  | 430/5     |

FOREIGN PATENT DOCUMENTS

| CN | 1624498 A     | 6/2005 |
| JP | 2004-45757 A  | 2/2004 |
| JP | 2005-31420 A  | 2/2005 |
| JP | 2005-84087 A  | 3/2005 |
| JP | 102005031420 A | 3/2005 |
| JP | 102005084087 A | 3/2005 |

OTHER PUBLICATIONS

Computer-generated translation of JP 2005-031420, with abstracts (Feb. 2005).*
Computer-generated translation of JP 2005-084087, with abstracts (Mar. 2005).*

* cited by examiner

*Primary Examiner* — John A. McPherson
(74) *Attorney, Agent, or Firm* — Morgan, Lewis & Bockius LLP

(57) ABSTRACT

A color filter substrate includes a first color filter layer on a substrate, and a second color filter layer on the substrate, the first color filter layer having a thickness different from a thickness of the second color filter layer.

4 Claims, 7 Drawing Sheets

ColorFilter Substrate and Method of Fabricating the Same

The present invention claims the benefit of Korean Patent Application No. 056853/2005 filed in Korea on Jun. 29, 2005, which is hereby incorporated by reference.

BACKGROUND OF THE INVENTION

1. Field of the Invention

The present invention relates to a display device, and more particularly, to a color filter substrate and a method of fabricating the same that prevent brightness failure from at an edge a liquid crystal display (LCD) device.

2. Discussion of the Related Art

As the modern society changes into an information-oriented society, an LCD display device has been in the limelight. Cathode ray tubes (CRTs), which are widely used up to now, have many advantages in aspects of performance and price, but they also have many disadvantages in aspects of miniaturization and portability. On the contrary, LCD devices have advantages of miniaturization, lightweight, slim profile, and low power consumption, and are drawing attention as an alternative capable of overcoming the disadvantages of the CRTs.

FIG. 1 is a partial schematic view of an LCD device according to the related art. In FIG. 1, an LCD device includes a color filter substrate 22, a thin film transistor (TFT) substrate 21, and a liquid crystal layer 17. The color filter substrate 22 includes a first insulation substrate 20, a black matrix 13 formed of chromium (Cr) or resin on the first insulation substrate 20, and a color filter layer 15 having red (R), green (G) and blue (B) color filter elements formed between lattices of the black matrix 13. In addition, a common electrode 11 of a transparent conductive metal is disposed on the entire surface of the first insulation substrate 20 including the black matrix 13 and the color filter layer 15. Further, the TFT substrate 21 facing the color filter substrate 22 includes a plurality of gate lines 1 and a plurality of data lines 3 intersecting the plurality of gate lines 1 to define a unit pixel region, a thin film transistor (TFT) 5 that is a switching element, and a pixel electrode 9 on a second insulation substrate 10.

The LCD device having the above construction controls light transmittance by rotating liquid crystal molecules of the liquid crystal layer 17 using an electric field generated between the pixel electrode 9 and the common electrode 11. Such light then passes through the R, G and B color filter layer 15 to display a color image.

FIG. 2 is a plan view of a color filter substrate of an LCD device according to the related art, and FIG. 3 is a cross-sectional view along I-I' of FIG. 2. In FIG. 2, a color filter substrate includes a black matrix 31 having a lattice structure on a substrate 30. R, G and B color resins are disposed between the lattices of the black matrix 31 to form red (R), green (G) and blue (B) color filter layers 35a, 35b and 35c. The black matrix 31 is formed in the shape of a lattice, and red (R), green (G) and blue (B) color filter layers 35a, 35b and 35c are disposed between the lattices of the black matrix 31. The R, G and B color filter layers 35a, 35b and 35c have the same thickness.

However, the color filter substrate having the above construction has a brightness failure at an edge region. For example, the edge region is much brighter than other regions. The brightness failure may be due to one or more of the following various reasons. First, pixel electrodes of the TFT substrate corresponding to an edge region of a color filter layer have fewer adjacent pixel electrodes than the pixel electrodes of other regions, e.g., pixel electrodes of a center region. As such, an electric field generated by the pixel electrodes disposed along the edge region is different from an electric field generated by the pixel electrodes disposed on a region other than the edge region, thereby causing brightness failure. Such a brightness failure can occur at all four edge regions of a panel, such as the upper edge region, the lower edge region, the right-side edge region and the left-side region.

In addition, a brightness failure can be caused by an alignment failure in an alignment layer, which is on the TFT substrate or the color filter substrate. For example, a rubbing process establishes an intended alignment direction in the alignment layer. However, the rubbing process can fail to establish the intended alignment direction at an edge portion of the alignment layer due to a height difference at the edge portion. As such, liquid crystal molecules at such an edge region are not aligned in the same manner as liquid crystal molecules at other regions. Thus, non-uniform brightness can occur at all four edge regions of a panel, such as the upper edge region, the lower edge region, the right-side edge region and the left-side region.

Further, in a storage-on-gate type LCD device, a dummy gate line overlaps pixel electrodes formed along the $1^{st}$ gate line of the TFT substrate, and a predetermined value of gate low voltage $V_{gl}$ is applied to the dummy gate line to form a storage capacitance in the pixel electrodes corresponding to the $1^{st}$ gate line. However, for the pixel electrodes corresponding to gate lines other than the $1^{st}$ gate line, a storage capacitance is generated between a $(N-1)^{th}$ gate line to which a pulse voltage is applied, and a pixel electrode corresponding to an $N^{th}$ gate line. Thus, the storage capacitance of the pixel electrodes corresponding to the $1^{st}$ gate line is different from the storage capacitance of other pixel electrodes, thereby causing brightness non-uniformity at an upper edge region.

Moreover, the $1^{st}$ data line and the last data line have an asymmetric structure not having an adjacent pixel electrode, unlike other data lines. In particular, $C_{dp}$ values generated between the $1^{st}$ data line and the pixel electrodes corresponding to the $1^{st}$ data line and between the last data line and the pixel electrodes corresponding to the last data line are different from $C_{dp}$ values between other data lines and pixel electrodes corresponding to the other data lines. Since the $C_{dp}$ values affect the storage capacitance formed in each pixel electrode, a brightness failure occurs at the lateral edge portions, i.e., the $1^{st}$ data line region and the last data line region.

SUMMARY OF THE INVENTION

Accordingly, the present invention is directed to a color filter substrate and a method of fabricating the same that substantially obviate one or more problems due to limitations and disadvantages of the related art.

An object of the present invention is to provide a color filter substrate and a method of fabricating the same that have improved brightness uniformity at an edge region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a substrate includes a first color filter layer on a substrate, and a second color filter layer on the substrate, the first color filter layer having a thickness different from a thickness of the second color filter layer.

In another aspect of the present invention, a substrate includes color filter elements on a substrate, the substrate including a first transmission region, a second transmission region and a third transmission region, the first transmission region having a lower light transmittance than the second transmission region, and the third transmission region substantially blocking light.

In yet another aspect of the present invention, a method of fabricating a substrate includes forming a first color filter layer and a second color filter layer on a substrate, the first color filter layer having a thickness different from a thickness of the second color filter layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to preferred embodiments of the present invention, examples of which are illustrated in the accompanying drawings.

Figure 1:
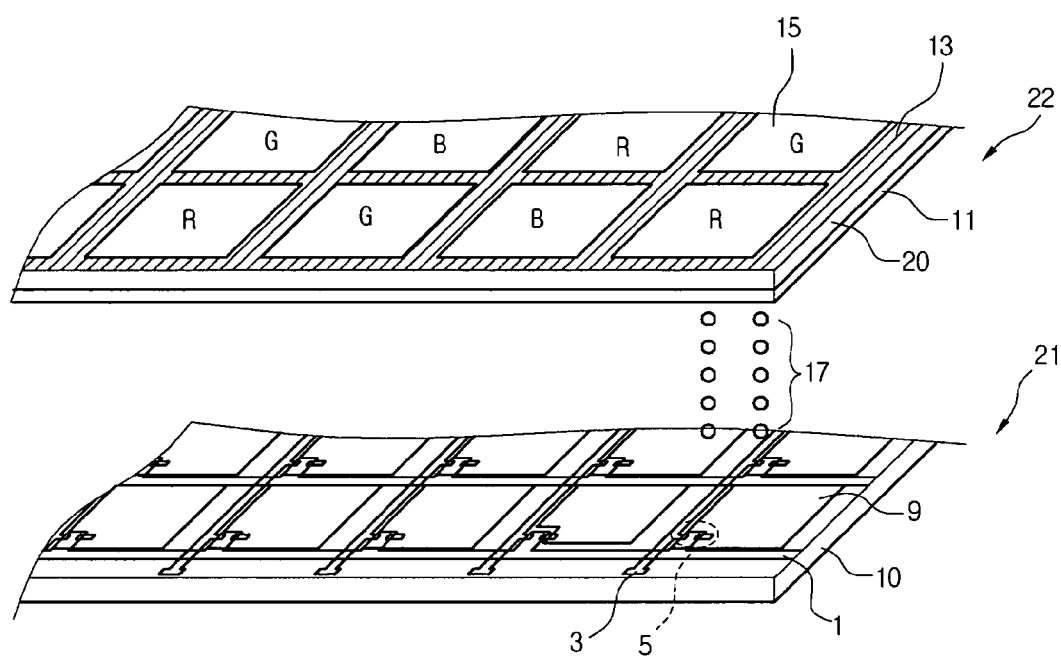
FIG. 1 is a partial schematic view of an LCD device according to the related art.
Figure 2:
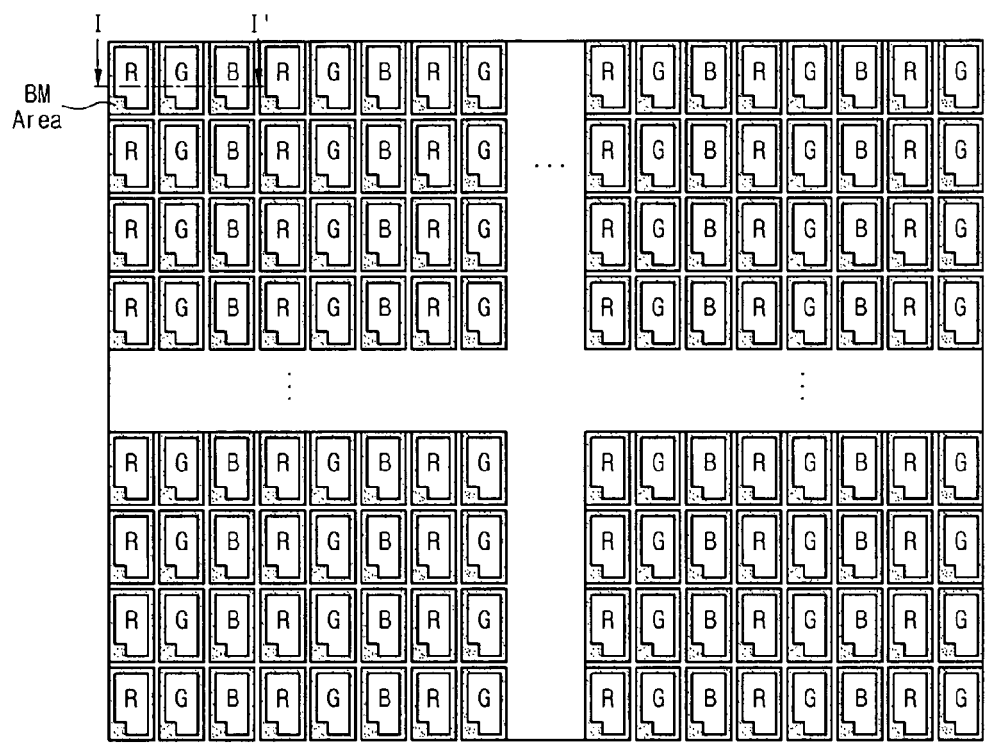
FIG. 2 is a plan view of a color filter substrate of an LCD device according to the related art.
Figure 3:
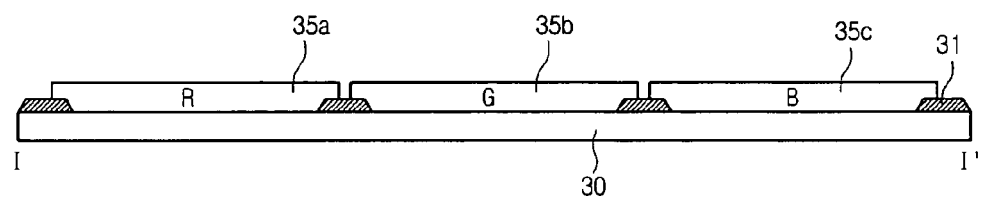
FIG. 3 is a cross-sectional view along I-I' of FIG. 2.
Figure 4:
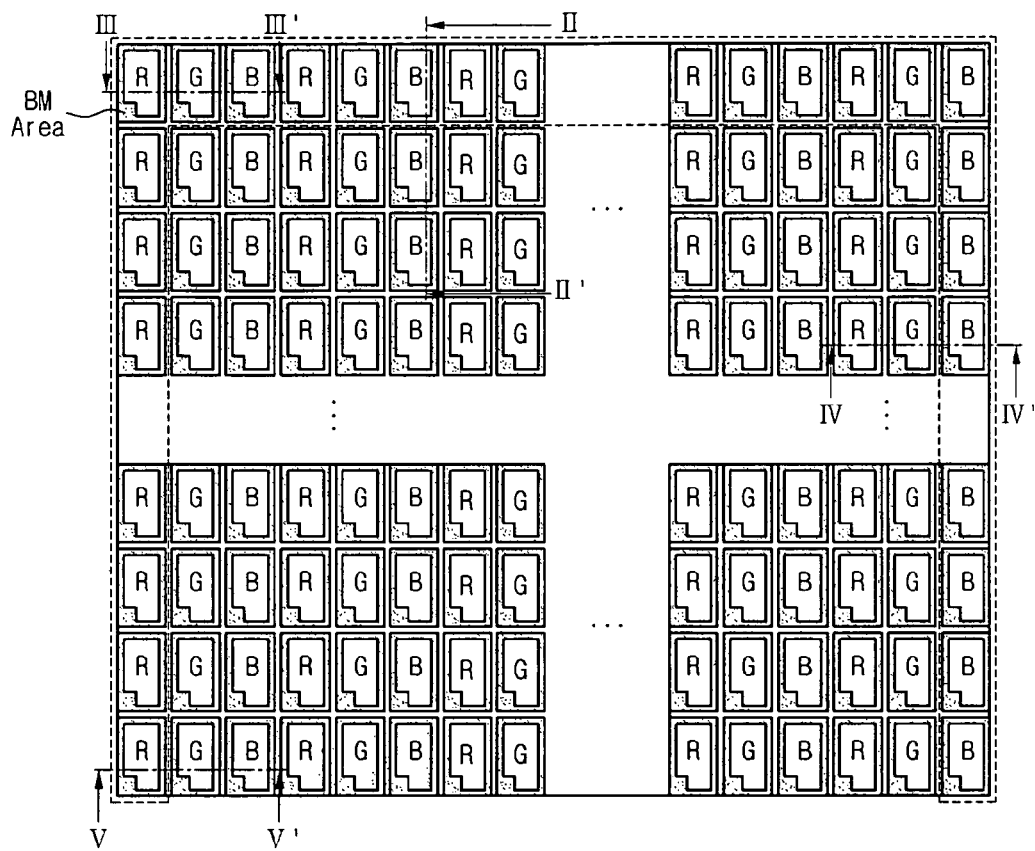
FIG. 4 is a plan view of a color filter substrate of an LCD device according to an embodiment of the present invention.
Figure 5A:
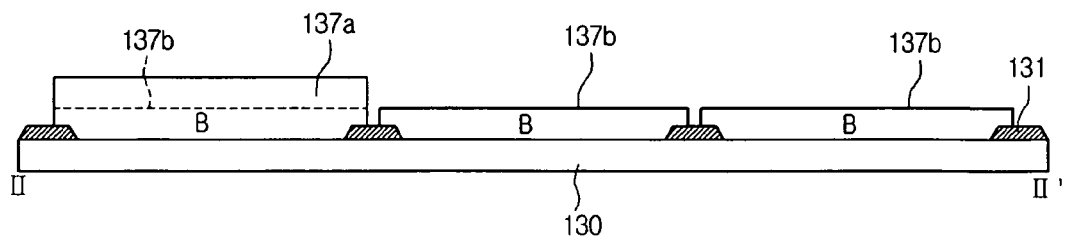
FIG. 5A is a cross-sectional view along II-II' of FIG. 4.
Figure 5B:
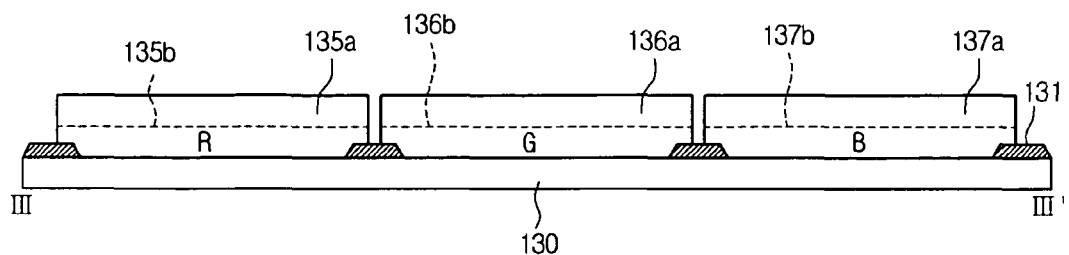
FIG. 5B is a cross-sectional view along III-III' of FIG. 4.
Figure 5C:
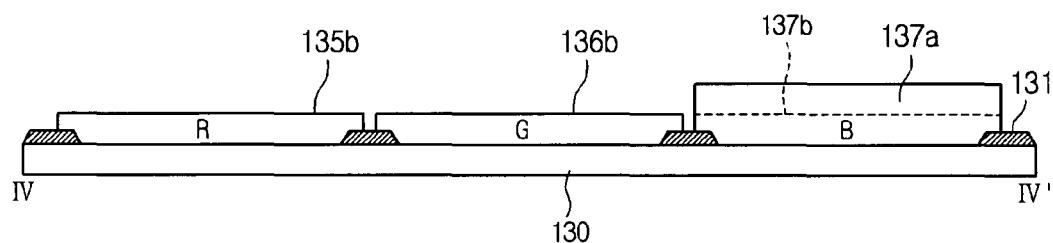
FIG. 5C is a cross-sectional view along IV-IV' of FIG. 4.
Figure 5D:
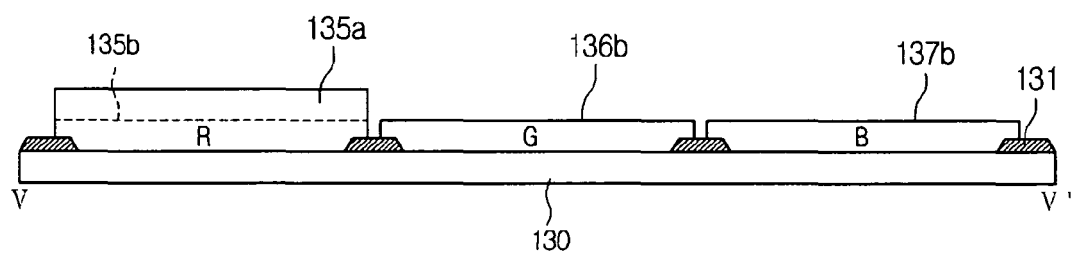
FIG. 5D is a cross-sectional view along V-V' of FIG. 4.

FIG. 4 is a plan view of a color filter substrate of an LCD device according to an embodiment of the present invention. FIG. 5A is a cross-sectional view along II-II' of FIG. 4, FIG. 5B is a cross-sectional view along III-III' of FIG. 4, FIG. 5C is a cross-sectional view along IV-IV' of FIG. 4, and FIG. 5D is a cross-sectional view along V-V' of FIG. 4.

In FIG. 4, a color filter substrate includes a black matrix (BM) 131 formed in the shape of a lattice on a substrate 130, and red (R), green (G) and blue (B) color filter layers alternatively disposed between the lattices of the black matrix 131.

The substrate 130 may be formed of a transparent insulative material, e.g., glass. The area indicated by dotted lines corresponds to an edge region where a brightness failure occurs in a related art device.

As shown in FIG. 5A, the first and second blue color filter layers 137a and 137b are formed on the substrate 130. The first blue color filter layer 137a is closer to a peripheral of the substrate 130 than the second blue color filter 137b, and is thicker than the second blue color filter layer 137b. In particular, the first blue color filter layer 137a disposed within the dotted line area of FIG. 4 corresponding to an edge region where a brightness failure occurs in the related art device. For the purpose of illustrating the thickness differences in FIG. 5A, the thickness of the second blue color filter layers 137b is shown in a dotted line overlapping the first blue color filter layer 137a.

Although not shown, the first and second blue color filter layers 137a and 137b may be simultaneously formed between the lattices of the black matrix 131 on the substrate 130. For example, the first and second blue color filter layers 137a and 137b may be formed by coating a blue color resin on the substrate 130 having the black matrix 131. The blue color resin may be coated to have a thickness that is the same or greater than a desired thickness for the first blue color filter layer 137a. Thereafter, the blue color resin is exposed to light using a halftone mask in different amounts of light at the edge region (the dotted line area of FIG. 4) and the remaining region, such that the first blue color filter layer 137a is patterned thicker than the second blue color filter layer 137b.

A color resin generally is a negative type, i.e., a portion exposed to light in the exposure operation remains, while a portion that is not exposed to the light is removed. Thus, for a color resin having a negative property, during the exposure operation, a full transmission region of the halftone mask is positioned to correspond to the thick color filter layer region, a partial transmission region of the halftone mask is positioned to correspond to the color filter layer region which is not related with the brightness failure improvement, and an opaque region, e.g., a BM area shown in FIG. 4, is positioned to correspond to the region where the color filter layer is not formed. Alternatively, if a the color resin is of a positive type, the exposure operation is performed in an opposite manner to that of the negative color resin, to thereby form color filter layers having different thicknesses in the same regions.

The halftone mask may include one of a diffractive mask, a slit mask, a MoSi phase shift mask, and a CrOx phase shift mask. The slit mask adjusts light transmittance using a light diffraction phenomenon. The MoSi phase shift mask and CrOx phase shift mask respectively have a single layer structure of a transmittance adjusting layer or a dual layer structure of a transmittance adjusting layer and a phase shift layer to adjust the transmittance.

After the exposure operation using the halftone mask is completed, a developing operation and a curing operation are sequentially performed to form the first blue color filter layer 137a and the second blue color filter layers 137b having a different thickness from the first blue color filter layer 137a.

As a result, for a color resin of a negative type, the first blue color filter layer 137a corresponding to the dotted line area of FIG. 4 (brightness failure improvement region) corresponds to the full transmission region of the halftone mask, and thus the thickness of the first blue color filter layer 137a is equal to the thickness of the color resin as first coated on the substrate 130. The second color filter layers 137b beyond the dotted line area of FIG. 4 correspond to the partial transmission region of the halftone mask, and accordingly the second color filter layers 137b are partially removed and thinner than the first blue color filter layer 137a. Lastly, the color resin coated on the region corresponding to the opaque region of the halftone mask is completely removed during the development operation after the exposure operation.

Thus, the color filter layer on the edge region is formed thicker than the color filter layer on other regions, to thereby decrease the amount of light passing through the edge region and to improve brightness uniformity.

As shown in FIG. 5B, first red (R), green (G) and blue (B) color filter layers 135a, 136a and 137a are formed in the brightness failure improvement region (dotted line area) of FIG. 4 having a larger thickness than the second red, green and blue color filter layers 135b, 136b and 137b. For the purpose of illustrating the thickness differences in FIG. 5B, the thickness of the second red, green and blue color filter layers 135b, 136b and 137b is shown in a dotted line overlapping the first red, green and blue color filter layers 135a, 136a and 137a. Thus, the second R, G and B color filter layers 135b, 136b and 137b which are relatively thinner than the first R, G and B color filter layers 135a, 136a and 137a are respectively formed on the region (other than the dotted line area of FIG. 4) where the brightness failure does not occur.

Since the region disposed along III-III' of FIG. 4 corresponds to an upper edge (i.e., pixel region corresponding to a first gate line) of the color filter substrate, it corresponds to the region where the brightness failure occurs. Accordingly, the color filter layers on the region disposed along III-III' of FIG. 4 is formed thicker than the color filter layers on the region where the brightness failure does not occur.

Although not shown, the black matrix 131 is formed on the substrate 130 prior to coating a red color resin on the entire surface of the substrate 130. The red color resin is coated in such a thickness that the brightness failure can be improved throughout the entire surface of the substrate 130, and is then patterned using a halftone mask to form color filter layers having different thicknesses at the region where the brightness failure occurs and the region where the brightness failure does not occur. In particular, the first thicker red color filter layer 135a and the second thinner red color filter layers 135b may be simultaneously formed. Then, the color resin coating, patterning, developing and curing process may be repeated sequentially for a green color resin and a blue color filter, and the order of coating red, green and blue color resins may be changed. The first green color filter layer 136a and first blue color filter layer 137a, which are thicker, are formed where the brightness failure occurs, while second green color filter layer 136b and second blue color filter layer 136b, which are thinner, are formed where the brightness failure does not occur.

In FIGS. 5C and 5D, the halftone masking process is employed to form the first blue color filter layer 137a and the first red color filter layer 135a, which are thicker, where the brightness failure occurs. On a region other than the dotted line area, the second red color filter layer 135b, the second green color filter layer 136b and the second blue color filter layer 137b, which are thinner than the first red color filter layer 135a and the first blue color filter layer 137a, are formed.

Thus, light that is incident into an edge region of the color filter substrate passes through the thicker color filter layers. Accordingly, the brightness of the light is lower than that of a light that passes through an area other than the edge region, so that any brightness failure does not occur. As such, picture quality is improved by forming a thicker color filter layer where the brightness failure occurs to decrease a light transmission amount.

Figure 6A:
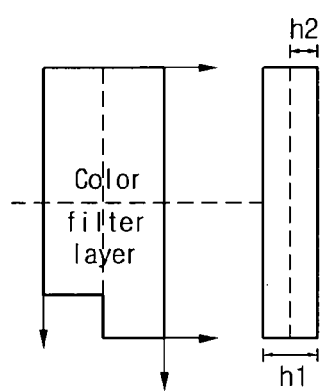
FIGS. 6a to 6D are schematic views illustrating structures of a unit color filter layer according to different embodiments of the present invention.
Figure 6A:
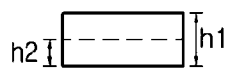

FIGS. 6a to 6D are schematic views illustrating structures of a unit color filter layer according to different embodiments of the present invention. In FIG. 6A, a unit color filter layer has a uniform thickness h1 that is greater than the thickness h2 of other color filter layers. As described with reference to FIGS. 5A through 5D, the R, G and B color filter layers positioned on the region where the brightness fail occurs are all formed thicker (in a thickness of h1), and the R, G and B color filter layers positioned on the region where the brightness fail does not occur are all formed thinner (in a thickness of h2).

Figure 6C:
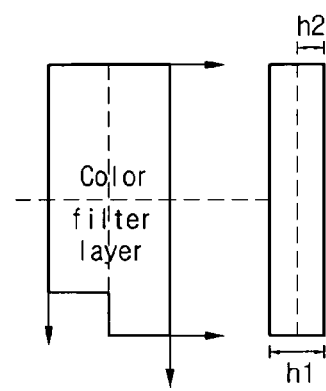
Figure 6C:
Figure 6B:
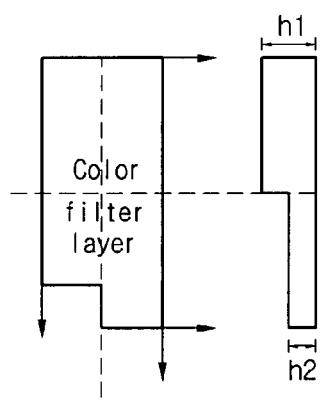
Figure 6B:
Figure 6D:
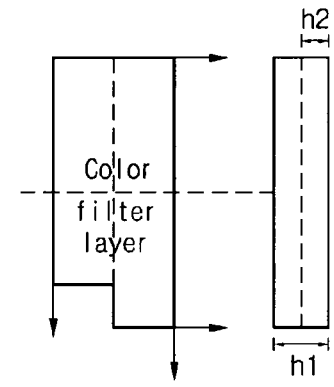
Figure 6D:
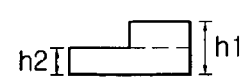

As shown in FIG. 6B, a unit color filter layer may have a non-uniform thickness within a unit pixel area thereof. Thus, in order to form the color filter layers having a non-uniform thickness within a unit pixel area, the full transmission region and the partial transmission region of the halftone mask may be employed for forming a unit color filter layer. For example, a portion having the thickness of h1 in the color filter layer corresponds to the full transmission region of the halftone mask and a portion having the thickness of h2 in the color filter layer corresponds to the partial transmission region.

Thus, when one unit color filter layer is designed to have a non-uniform thickness, an amount of light passing through the region having the thickness of h1 is different from an amount of light passing through the region having the thickness of h2. However, since one color filter layer has a very small area, the light passing through one unit color filter layer may be constant as a whole.

In other words, the color filter layer having a non-uniform thickness within the unit region thereof has a lower brightness than the color filter layer having the thickness of h2 (thin) within the unit region thereof and has a higher brightness than the color filter layer having the thickness of h1 (thick) within the unit region thereof, such that light transmittance is adjustable.

Alternatively, a color filter layer is designed such that the thickness of a portion disposed at an upper side of a horizontal reference line within the unit region thereof is h1 and the thickness of a portion disposed at a lower side of the horizontal reference line is h2 as shown in FIG. 6B.

As shown in FIG. 6C, in a unit color filter element, the thickness of a portion disposed at a left side of a horizontal reference line is h1 and the thickness of a portion disposed at a right side of the horizontal reference line is h2. In addition, as shown FIG. 6D, in a unit color filer element, the thickness of a portion disposed at a left side of a horizontal reference line is h2 and the thickness of a portion disposed at a right side of the horizontal reference line is h1.

Although not shown, since the color filter layer having a non-uniform thickness within the unit region thereof may be formed to adjust the brightness, a color filter layer may be designed in the same principle, such that a central region thereof is thicker or thinner and a peripheral region outside the central region is thinner or thicker.

Further, although not shown, the color filter layers having different thicknesses may be implemented in a color filter-on-TFT (COT) or a TFT-on-color filter (TOC) substrate. For example, the color filter layers having different thicknesses may be formed on or under a switching element, e.g., a thin film transistor. In addition, the color filter layers having different thicknesses may be employed in other types of display devices, such as plasma display panel (PDP) devices and electroluminescent display (ELD) devices.

Also, by employing the method of varying the thickness of the color filter layer depending on a position, all unit regions of a color filter layer are formed having a non-uniform thickness structure, to thereby adjust the brightness. To form the color filter layer having several different thicknesses within the unit area thereof, it is required to use a halftone mask having a plurality of full transmission regions and a plurality of partial transmission regions on a portion corresponding to all the unit regions of the color filter layer.

Figure 7:
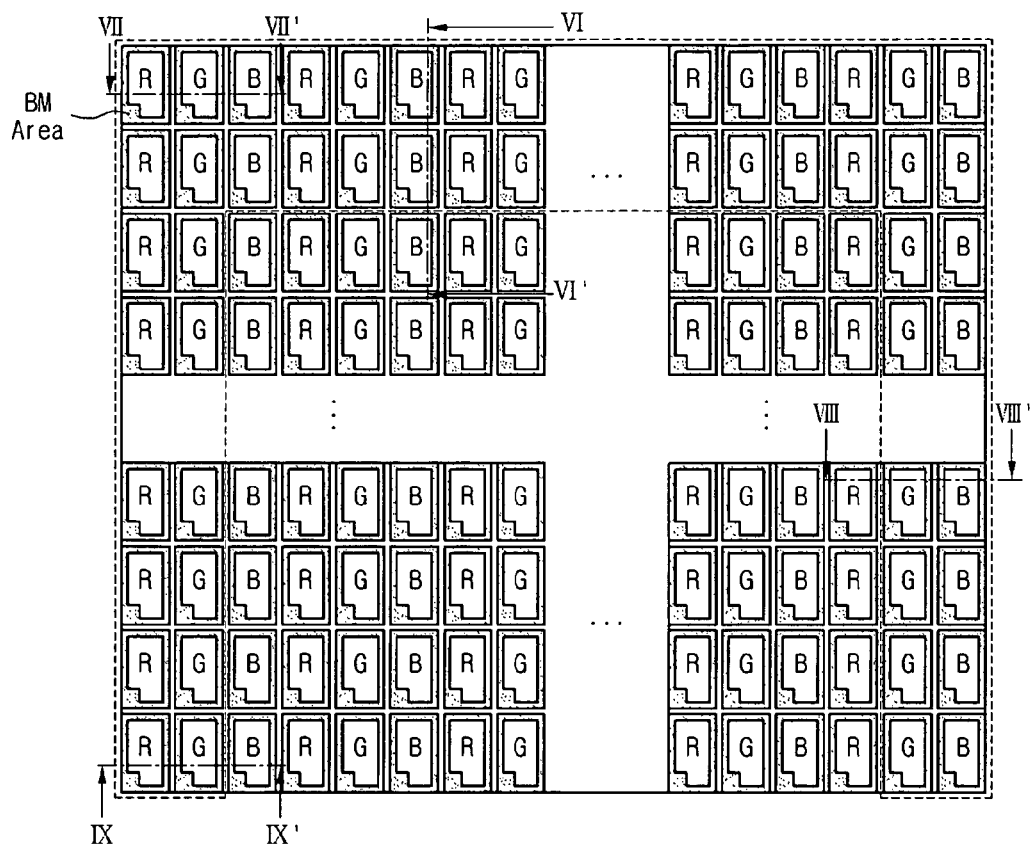
FIG. 7 is a plan view of a color filter substrate of an LCD device according to another embodiment of the present invention.
Figure 8A:
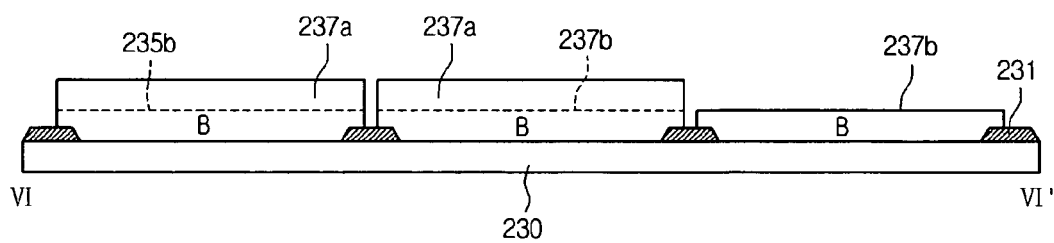
FIG. 8A is a cross-sectional view along VI-VI' of FIG. 7.

FIG. 7 is a plan view of a color filter substrate of an LCD device according to another embodiment of the present invention, and FIG. 8A is a cross-sectional view along VI-VI' of FIG. 7. In FIG. 7, a color filter substrate includes a black matrix (BM) 131 formed in the shape of a lattice on a substrate 230, and red (R), green (G) and blue (B) color filter layers alternatively disposed between the lattices of the black matrix 231. The substrate 230 may be formed of a transparent insulative material, e.g., glass.

The area indicated by dotted lines corresponds to an expanded edge region including a region where a brightness failure occurs in a related art device. In particular, the dotted expanded edge region include at least color filters corresponding to at least two data lines and gat lines along the edge of the color filter substrate. Thus, a brightness non-uniformity generated on pixel regions corresponding a region from the $1^{st}$ gate line to at least two gate lines, a region from the $1^{st}$ data line to at least two data lines, and a region from a data line of a last column to the second from the data line of the last column is prevented.

In other words, the color filter layers corresponding to two data lines and two gate lines positioned along the edge of the color filter substrate are formed thicker, and the remaining color filter layers are formed in a general thickness. As such, the brightness failure can be prevented even in a wide area without extending the black matrix area. Accordingly, the brightness failure can be improved without the aperture ratio being decreased.

As shown in FIG. 8A, the first and second blue color filter layers 237a and 237b are formed on the substrate 230 with two first blue color filter layers 237a formed immediately adjacent to one another. The two first blue color filter layer 237a are closer to a peripheral of the substrate 230 than the second blue color filter 237b, and are thicker than the second blue color filter layer 237b. In particular, the two first blue color filter layer 237a disposed within the dotted line area of FIG. 7. For the purpose of illustrating the thickness differences in FIG. 8A, the thickness of the second blue color filter layers 237b is shown in a dotted line overlapping the first blue color filter layer 237a.

Although not shown, the first and second blue color filter layers 237a and 237b may be simultaneously formed between the lattices of the black matrix 231 on the substrate 230. For example, the first and second blue color filter layers 237a and 237b may be formed by coating a blue color resin on the substrate 230 having the black matrix 231. The blue color resin may be coated to have a thickness that is the same or greater than a desired thickness for the first blue color filter layer 237a. Thereafter, the blue color resin is exposed to light using a halftone mask in different amounts of light at the edge region (the dotted line area of FIG. 7) and the remaining region, such that the first blue color filter layers 237a are patterned thicker than the second blue color filter layer 237b.

For example, for a color resin of a negative type, the first blue color filter layer 237a corresponds to the full transmission region of the halftone mask, and thus the thickness of the first blue color filter layer 237a is equal to the thickness of the color resin as first coated on the substrate 230. The second color filter layers 237b beyond the dotted line area of FIG. 7 correspond to the partial transmission region of the halftone mask, and accordingly the second color filter layers 237b are partially removed and thinner than the first blue color filter layer 237a. Lastly, the color resin coated on the region corresponding to the opaque region of the halftone mask is completely removed during the development operation after the exposure operation.

In addition, the first blue color filter layer 237a may be formed in various thicknesses and structures as described with reference to FIGS. 6A through 6D. Therefore, a color filter layer having different thicknesses within one color filter layer area, or a color filter layer having a thickness within one color filter layer area which is thicker than other color filter layer can be formed by adjusting the full transmission region and the partial transmission region of the halftone mask.

Figure 8B:
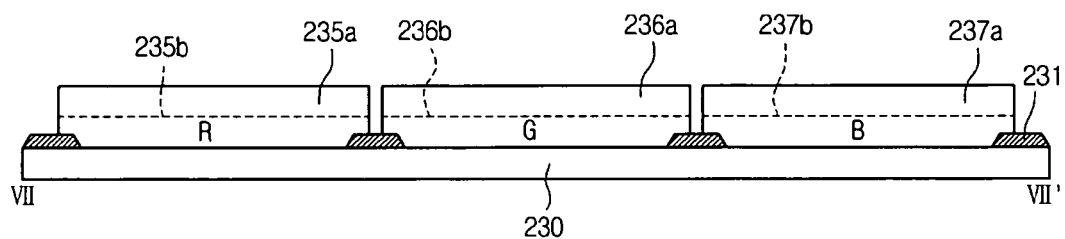
FIG. 8B is a cross-sectional view along VII-VII' of FIG. 7.
Figure 8C:
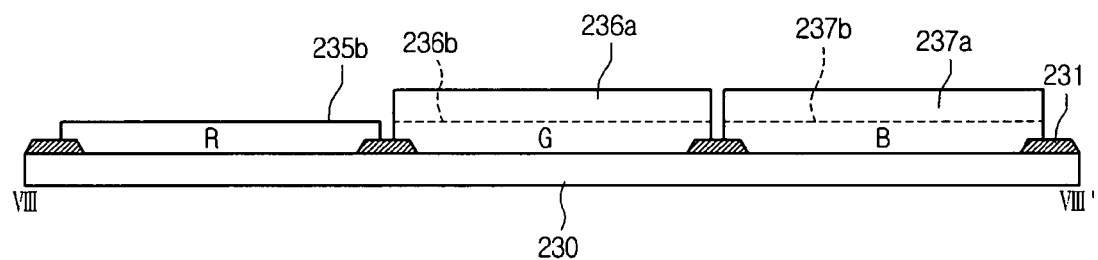
FIG. 8C is a cross-sectional view along VIII-VIII' of FIG. 7.
Figure 8D:
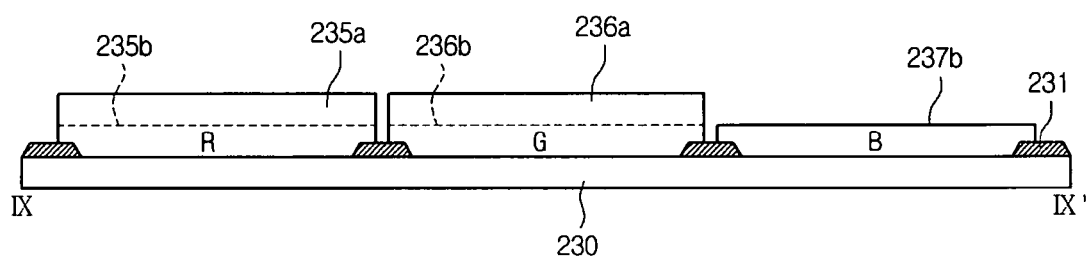
FIG. 8D is a cross-sectional view along IX-IX' of FIG. 7.

FIG. 8B is a cross-sectional view along VII-VII' of FIG. 7, FIG. 8C is a cross-sectional view along VIII-VIII' of FIG. 7, and FIG. 8D is a cross-sectional view along IX-IX' of FIG. 7. As shown in FIGS. 8B, 8C and 8D, first red (R), green (G) and blue (B) color filter layers 235a, 236a and 237a are formed in the brightness failure improvement region (dotted line area) of FIG. 7 having a relatively greater thickness than second red, green and blue color filter layers 235b, 236b and 237b. A halftone masking process is employed to form the first red color filter layer 235a, the first green color filter layer 236a and the first blue color filter layer 237a, which are thicker, where the brightness failure occurs. On a region other than the dotted line area, the second red color filter layer 235b, the second green color filter layer 236b and the second blue color filter layer 237b, which are thinner than the first red color filter layer 235a, the first green color filter layer 236a and the first blue color filter layer 237a, are formed.

For the purpose of illustrating the thickness differences in FIGS. 8B, 8C and 8D, the thickness of the second red, green and blue color filter layers 235b, 236b and 237b is shown in a dotted line overlapping the first red, green and blue color filter layers 235a, 236a and 237a. Thus, the second R, G and B color filter layers 235b, 236b and 237b which are relatively thinner than the first R, G and B color filter layers 235a, 236a and 237a are respectively formed on the region (other than the dotted line area of FIG. 7) where the brightness failure does not occur.

Although not shown, the black matrix 231 is formed on the substrate 130 prior to coating a red color resin on the entire surface of the substrate 230. The red color resin is coated in such a thickness that the brightness failure can be improved throughout the entire surface of the substrate 230, and is then patterned using a halftone mask to form color filter layers having different thicknesses at the region where the brightness failure occurs and the region where the brightness failure does not occur. In particular, the first thicker red color filter layer 235a and the second thinner red color filter layers 235b may be simultaneously formed. Then, the color resin coating, patterning, developing and curing process may be repeated sequentially for a green color resin and a blue color filter, and the order of coating red, green and blue color resins may be changed. The first green color filter layer 236a and first blue color filter layer 237a, which are thicker, are formed where the brightness failure occurs, while second green color filter layer 236b and second blue color filter layer 236b, which are thinner, are formed where the brightness failure does not occur.

As shown in FIG. 8C, the second red color filter layer 235b, the first green color filter layer 236a and the first blue color filter layer 237a are sequentially arranged along the sectional line VIII-VIII' of FIG. 7. Also, as shown in FIG. 8D, the first red color filter layer 235a, the first green color filter layer 236a and the second blue color filter layer 237b are sequentially arranged along the sectional line IX-IX' of FIG. 7. Thus, the brightness failure can be improved by increasing the number of columns and rows of the thicker color filter layers.

Although not shown, the color filter layers having different thicknesses may be implemented in a color filter-on-TFT (COT) or a TFT-on-color filter (TOC) substrate. For example, the color filter layers having different thicknesses may be formed on or under a switching element, e.g., a thin film transistor. In addition, the color filter layers having different thicknesses may be employed in other types of display devices, such as plasma display panel (PDP) devices and electroluminescent display (ELD) devices.

While FIGS. 8A through 8D illustrate that the color filter layers of the color filter substrate facing pixel electrodes corresponding to two edge data lines and two edge gate lines are formed thicker, the same principle may be applied to color filter layers facing pixel electrodes corresponding to two or more data lines and gate lines. In embodiments of the present invention, the color filter layers corresponding to the first gate line, the first data line and the last data line, and the color filter layers corresponding to the first and second gate lines, the first and second data lines and the data line of the last column and the second from the data line of the last column are formed thicker using the halftone mask, thereby improving brightness uniformity.

The brightness failure can occur at a central portion or a specific portion of the display area due to characteristics of the pixel structure or time division structure of the TFT substrate as well as along the edge of the color filter substrate. Thus, although not shown, a color filter layer in a non-peripheral region may be formed thicker than other color filter layer, to thereby prevent the brightness failure. For example, the color filter layers is formed using the halftone mask to have different thicknesses, to thereby adjust light transmittance thereof. Accordingly, it is possible to adjust the thickness of the central region of the color filter layers as well as the thickness of the edge region.

Thus, when the brightness failure occurs due to a structural difference of the TFT substrate or the color filter substrate, or a difference in alignment of liquid crystal molecules, the color filter layers are formed in different thicknesses in the region where the brightness failure occurs and the region where the brightness failure does not occur, thereby preventing the brightness failure.

As described above, according to embodiments of the present invention, the color filter layers on a substrate are formed in various thicknesses to adjust the amount of light passing through the color filter layers, to thereby improve brightness uniformity. For example, a thick color filter layer may be in an edge region or a non-edge region of the substrate. In addition, the thicknesses of the color filter layers are adjusted using the halftone mask, and the color filter layers having different thicknesses are formed by one masking process.

Further, the color filter layers having different thicknesses may be implemented in a color filter-on-TFT (COT) or a TFT-on-color filter (TOC) substrate. For example, the color filter layers having different thicknesses may be formed on or under a switching element, e.g., a thin film transistor. In addition, the color filter layers having different thicknesses may be employed in other types of display devices, such as plasma display panel (PDP) devices and electroluminescent display (ELD) devices.

It will be apparent to those skilled in the art that various modifications and variations can be made in the color filter substrate and the method of fabricating the same of the present invention without departing from the spirit or scope of the invention. Thus, it is intended that the present invention covers the modifications and variations of this invention provided they come within the scope of the appended claims and their equivalents.

What is claimed is:

1. A method of fabricating a substrate having a display area including a plurality of pixel regions, a first area along an outer edge of the plurality of pixel regions and second area excluding the first area, comprising:
    forming a plurality of color filter layers on the plurality of pixel regions of a substrate, respectively, the color filter layers in first area having thicknesses different from that of the color filter layers in second area,
    wherein the forming a plurality of color filter includes;
    coating a color resin on the substrate;
    disposing a mask over the coated color resin, the mask including a full transmission region corresponding to the first area and a partial transmission region corresponding to the second area;
    exposing different amounts of light through the full transmission region and the partial transmission region of the mask on the coated color resin; and
    developing the exposed color resin to simultaneously form the plurality of color filter layers.

2. The method according to claim 1, further comprising:
    before the color filter layers, forming a black matrix on the substrate.

3. The method according to claim 1, wherein the outer edge has a width including one color filter layer or two color filter layer.

4. The method according to 1, wherein the color filter layers in first area having thicknesses thicker than from that of the color filter layers in second area.

* * * * *